United States Patent [19]

Berthelsen

[11] 4,194,699
[45] Mar. 25, 1980

[54] APPARATUS FOR CUTTING UP AND CONVEYING MATERIAL

[76] Inventor: Mogens Berthelsen, Rislykke, Vejleby, 4970 Rodby, Denmark

[21] Appl. No.: 880,544

[22] Filed: Feb. 23, 1978

[30] Foreign Application Priority Data

Feb. 24, 1977 [DK] Denmark .............................. 804/77

[51] Int. Cl.² .............................................. B02C 7/04
[52] U.S. Cl. .................................... 241/236; 241/243; 414/787
[58] Field of Search ................. 241/236, 243, 167, 86, 241/88, 88.4, 190, 187; 214/309, 310; 414/787

[56] References Cited

U.S. PATENT DOCUMENTS

| 591 | 2/1838 | Bent | 241/243 |
|---|---|---|---|
| 52,199 | 1/1866 | Price | 241/243 |
| 130,883 | 8/1872 | Tyler | 241/243 X |
| 2,701,596 | 2/1955 | Myrold et al. | 241/236 X |
| 3,606,265 | 9/1971 | Cobey | 241/230 X |

FOREIGN PATENT DOCUMENTS 282352 8/1971 U.S.S.R. .................................. 241/190

Primary Examiner—Robert L. Spruill
Assistant Examiner—Robert P. Olszewski
Attorney, Agent, or Firm—A. C. Nolte, Jr.; Edward B. Hunter

[57] ABSTRACT

An apparatus for cutting and conveying material, comprising a container with an insertion aperture, cutting and conveying means and outlet means, the apparatus having above the bottom of the container cutting means for cutting grooves in the material and conveying means for conveying the material between the grooves.

20 Claims, 4 Drawing Figures

APPARATUS FOR CUTTING UP AND CONVEYING MATERIAL

The invention relates to an apparatus for cutting up and conveying material, comprising a container with an insertion aperture, cutting and conveying means and outlet means. The apparatus is especially adapted for cutting up straw bales and conveying the straw material to a furnace.

It is the object of the invention to provide an apparatus of the type stated which is efficient, simple and reliable and have a small power consumption.

According to the invention this is obtained thereby that the apparatus above the bottom of the container has cutting means for cutting grooves in the material and conveying means for conveying the material between the grooves.

The drawing shows schematically an apparatus according to the invention.

Figure 1:
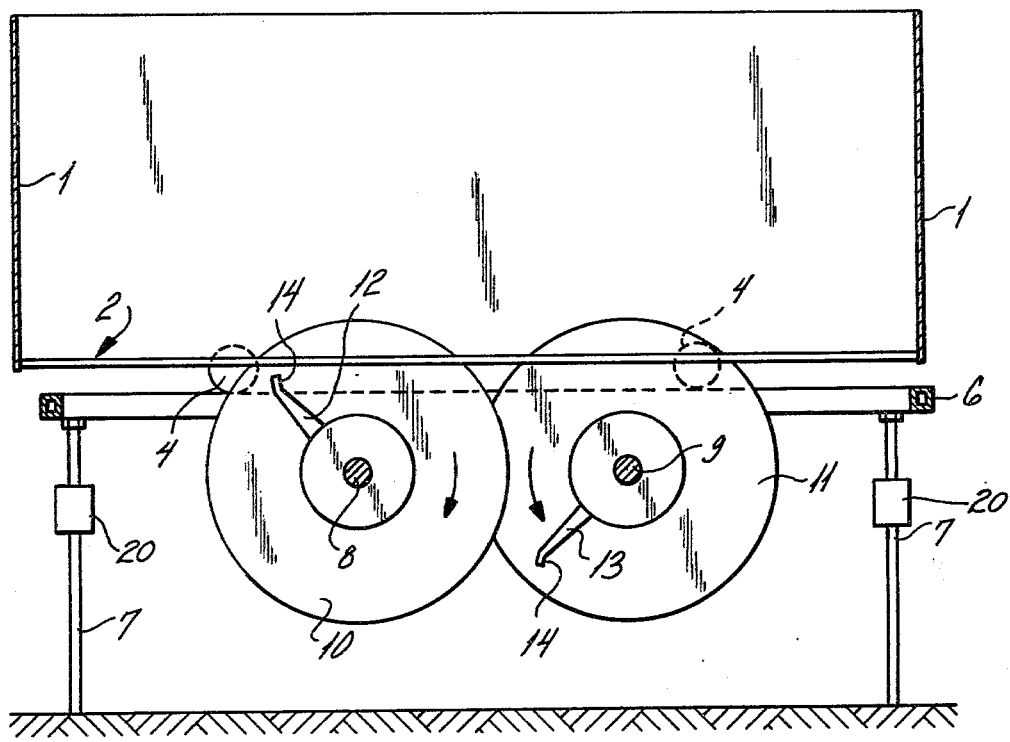
FIG. 1 shows a vertical sectional view through the apparatus.
Figure 2:
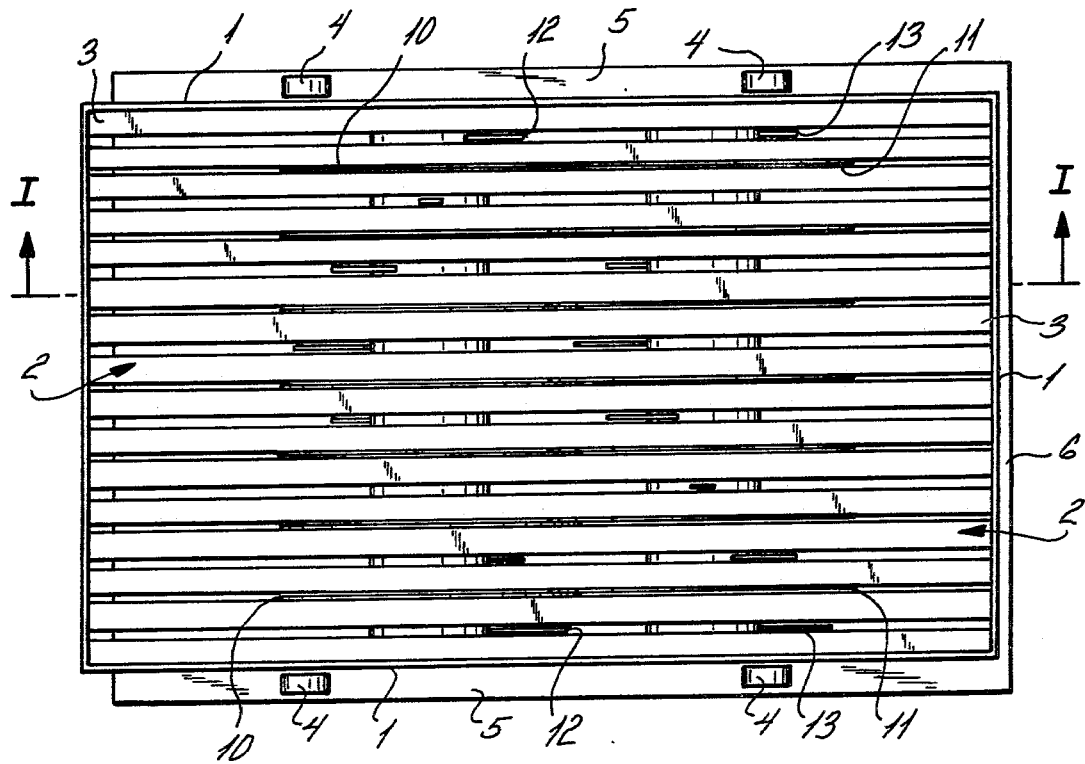
FIG. 2 shows the apparatus seen from above.

The apparatus shown has a rectangular container having a vertical rectangular wall 1. The container is open above and has below a grate 2 having broad grate rods 3 and narrow interspaces. The container has rollers 4 which can rotate on fixed axes on the container and can roll on guiding rails 5 which are arranged on a frame 6 and can be adjusted up and down by means of adjustment means, illustrated schematically at 20. The frame 6 is supported on legs 7. In the support consisting of the frame 6 and the legs 7 are rotatory horizontal shafts 8 and 9 on which cutting means are attached, said cutting means being circular thin discs 10 and 11 overlapping each other, and which are elastic or spring loaded so as to bear on each other. Furthermore, on the shafts are attached conveying fingers 12 and 13, having at the outer end a deflected portion 14. The apparatus has control and drive means, not shown.

Figure 4:
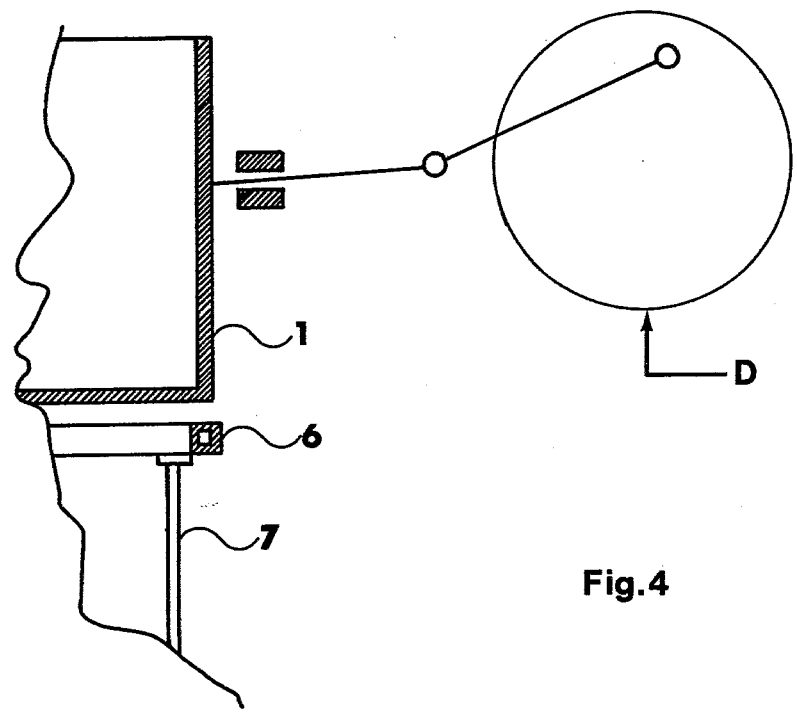
FIG. 4 shows a partial view of FIG. 1 with the drive mechanism attached.

When the apparatus is working the shafts 8 and 9 rotate in opposite directions so that the overlapping portions move downwards. The fingers 12 an 13 have a radial extension, including the deflected portion 14, which is smaller than the radial extension of the discs 10 and 11, and they are offset in relation to each other in such a manner that when the finger 12 is in the mid of the overlapping area then the finger 13 is farest away from the overlapping area. The container 1 with the grate 2 is connected with a drive mechanism, illustrated schematically at D in FIG. 4, which moves it forwards and backwards, the container moving by means of the rollers on the rails 5. The length of this movement forwards and backwards may substantially be twice the distance from the frame 6 to the top point of the thin cutting discs 10 and 11 so that there is no tendency to accumulation of material.

Straw bales are put in the container 1, 2. The discs 10 and 11 cut grooves in the straw bales. Furthermore, they cut the strings arranged around the straw bales, and as this cutting is made mutually in several places there is no tendency thereto that long pieces of string will be drawn by the discs and roll around the shafts 8 and 9. The conveying fingers 12 and 13 engage the straw bales and can easily convey straw as this beforehand has been loosened by means of the grooves made by the discs 10 and 11. The fingers are arranged helically along the length of the shafts so that conveying is not made simultaneously over the whole length of the shafts, and therefore a smooth working with a small power consumption is obtained. The rails 5 can be adjusted up and down for adjusting the distance which the discs 10 and 11 an the fingers 12 and 13 project above the grate 2. Hereby an adjustment according to the material to be cut can be made. Moreover the quantity cut per time unit can hereby be adjusted without it being necessary to alter the rotation speed of the shafts 8 and 9. The straw bales may be carried to the container 1,2 manually or by means of a conveyor. The cut material can advantageously be removed by means of a conveyor or be carried directly to a straw furnace.

Figure 3:
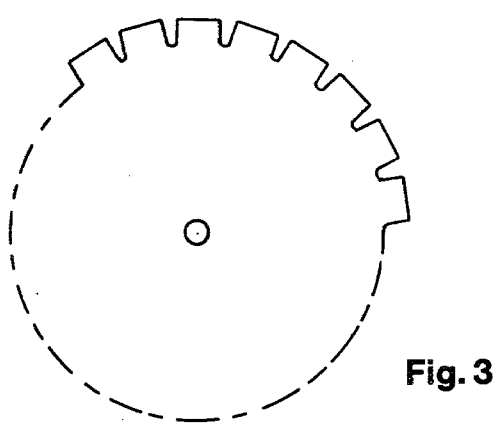
FIG. 3 shows an alternative cutting blade for the apparatus of FIGS. 1 and 2.

The apparatus shown and described is only to be considered as an example, seeing that within the frame of the invention many modifications can be made. For example an embodiment is possible in which a container with grate has grate rods extending along circular arcs and in which the container can oscillate on the axis defined by the grate rods. Moreover, embodiments are possible in which the container can turn in one direction, especially a cylindrical or conical container the side wall of wich is made of grate rods which for fixing may be connected with axial rods arranged within the grate rods and thereby giving room for the discs 10 and 11 and the fingers 12 and 13. Such container may be placed horizontally or with an inclined axis and be open in one end whereas the other end is covered by an end wall. Moreover, embodiments are possible, having only one shaft. In this case the cutting discs arranged thereon can cooperate with cutting members fixedly arranged or movable forwards and backwards. The discs may have incisions spaced along the circumference so that the cutting edge is discontinuous as for example as illustrated schematically in FIG. 3 or they may have an other outer shape, for instance hexagonal or oval. Two or more conveying fingers may be arranged in one plane.

In the shown and other embodiments the bales may be put down pell-mell in the container 1,2, and a great quantity may be inserted each time without it having any influence upon the effect per time unit. The cut straw is given off in a very small region in spite of the filling-in region is great. The apparatus is well adapted for handling straw bales of very different size and shape. It is not necessary that the discs overlap each other, seeing that the cutting takes place above the grate where they do not overlap each other. On the other hand, the overlapping arrangement is advantageous because the overlapping can give the effect that a long piece of string can be fixed, for instance clamped, without clipping whereupon the string piece is given off downwards.

The conveying members may be helical conveyors in the bottom of the container between the cutting members. They may also be projections on chain conveyors.

I claim:

1. Apparatus for processing material comprising a container for material to be processed, an opening to the interior of the casing through which material to be processed is delivered, a discharge opening from the container from which processed material exits the container, cutting means disposed to cut parallel grooves in material contained in the container adjacent the discharge opening thereof, conveying means movable to engage cut material between said grooves and convey said cut material to said discharge opening and means for causing said container and cutting means to be reciprocated relative to each other to cause said grooves to be cut.

2. Apparatus as claimed in claim 1 wherein a bottom of the container is formed as a grate and the cutting means project through apertures defined in said grate.

3. Apparatus as claimed in claim 1 wherein a bottom of the container is formed as a grate and the conveying means project through apertures formed in said grate said apertures defining said discharge opening.

4. Apparatus as claimed in claim 2 wherein said conveying means also project through said apertures.

5. Apparatus as claimed in claim 1 wherein said cutting means comprise cutting member secured on at least one shaft, said shaft being disposed below said container, said container having an apertured bottom and said cutting members projecting upwardly through said apertures.

6. Apparatus as claimed in claim 2 wherein said cutting means comprises cutting members secured on at least one shaft, said shaft being disposed below the bottom of said container.

7. Apparatus as claimed in claim 1 wherein said conveying means comprises conveying members secured on at least one shaft said shaft being disposed below the bottom of said container, said container being apertured and said conveying members projecting upwardly through said apertures.

8. Apparatus as claimed in claim 1 wherein said cutting means comprise pairs of cutting members, the cutting members of each said pair cooperating with each other and moving in opposite directions.

9. Apparatus as claimed in claim 1 comprising a pair of shafts each shaft having projecting conveying and cutting members constituting said conveying and cutting means, respectively, said shafts rotating in opposite directions and being disposed relative to each other such that during rotation said conveying and cutting members overlap each other.

10. Apparatus as claimed in claim 9 wherein said cutting members comprise thin disc-like elements.

11. Apparatus as claimed in claim 6 wherein said cutting members comprise thin disc-like elements.

12. Apparatus as claimed in claim 8 wherein said cutting members comprise thin disc-like elements.

13. Apparatus as claimed in claim 10 wherein the edges of said cutting members are substantially continuous.

14. Apparatus as claimed in claim 10 wherein the cutting edges of said cutting members is discontinuous.

15. Apparatus as claimed in claim 9 wherein said conveying members comprise projecting fingers.

16. Apparatus as claimed in claim 15 wherein an end portion of each said finger remote from said shaft extends forwardly in the direction of rotation of said shaft.

17. Apparatus as claimed in claim 2 wherein said grate is comprised of a plurality of parallel rods said rods being substantially rectilinear.

18. Apparatus as claimed in claim 5 wherein said shafts are fixed and wherein said container is movable in the direction at right angles to said shafts.

19. Apparatus as claimed in claim 9 wherein said shafts are fixed and wherein said container is movable in the direction at right angles to said shafts.

20. Apparatus as claimed in claim 5 wherein said container is supported upon guide means and wherein the vertical spacing between said guide means and said shafts is adjustable whereby the projection of said cutting members and conveying members through said grate is variable.

* * * * *